: 2,886,524
Patented May 12, 1959

2,886,524

CLAY GREASE COMPOSITIONS AND PROCESS OF PREPARATION THEREFOR

Jack W. Armstrong and Donald M. Preiss, Concord, Calif., assignors to Shell Development Company, New York, N.Y., a corporation of Delaware No Drawing. Application January 27, 1956
Serial No. 561,922

11 Claims. (Cl. 252—28)

This invention relates to modified clay compositions and to clay grease compositions and to an improved process for the preparation thereof. More particularly, it is related to improved greases especially useful for operation at elevated temperatures and in the presence of contaminating proportions of water.

Copending application Serial No. 490,695, filed February 25, 1955, in which one of the present applicants is an inventor, is directed to grease compositions gelled with inorganic colloids, said colloids bearing a surface coating of a thermosetting aldehydic resin. Such resins may comprise either aminoplasts or phenoplasts exemplified by urea-formaldehyde resins and phenol-formaldehyde resins, respectively. The greases so prepared are especially useful at extremely high temperatures, such as 450–500° F. Preferably they are comprised of a major amount of a silicone fluid or other thermally stable lubricant.

Another copending application, Serial No. 552,271, filed December 12, 1955, now U. S. Patent 2,829,100, in the names of both of the inventors in this case and one other, describes an improvement in the preparation of greases stabilized by the presence of aminoplast resins comprising the use of the polymer-forming amine such as aniline or the like in concentrating the original clay hydrogel and improving its filterability prior to resin formation with an aldehyde. Other means of preparing the subject type of greases are described in the first mentioned copending application, Serial No. 490,695. These comprise aerogel formation, which is an expensive process, and solvent displacement without previous water separation, which necessitates the use of large volumes of solvent requiring subsequent removal by evaporation prior to or during resin formation.

One of the disadvantageous features of either of these processes comprises the poor filterability characteristics of a hydrogel such as is formed by dispersion of a high base exchange clay or the like in water. In order to avoid the use of unduly large amounts of displacement organic solvents, it was the previous practice to filter the clay hydrogel, whereby a substantial proportion of the water was separated, leaving a hydrogel of greater concentration of clay. However, this proceeded with great difficulty and required extended periods of filtration time and, consequently, of filtration capacity.

It is an object of the present invention to improve the process for the preparation of clay greases. It is another object of this invention to provide grease concentrates which may be diluted with any desired type of lubricating oil. It is a further object of this invention to provide novel grease compositions having outstanding thermal and oxidation stability as well as excellent water resistance. Other objects will become apparent from the description of the invention.

Now, in accordance with the present invention, it has been found that grease compositions having outstanding thermal and oxidation stability as well as high water resistance comprise a lubricating oil gelled with a colloidally dispersed clay which clay bears adsorbed on the surfaces thereof between about 10% and about 100% by weight of an oxidized aniline compound.

Still in accordance with this invention, an improved process for the preparation of the subject class of greases comprises the following sequence of steps: Clay is dispersed in water to form a fluid hydrogel. In this state the clay is colloidally dispersed to such an extent that water can be separated therefrom only with great difficulty or by the use of large differential pressures. However, the clay is apparently associated directly with only a portion of the water present, the balance of the water comprising a medium in which the concentrated clay hydrogel particles are suspended. In order to improve the separation of this more concentrated hydrogel from the suspending water, aniline is added to the hydrogel, preferably in an amount of at least about 10% by weight of the dry clay and less than about 200% by weight thereof. This causes rapid separation of the more concentrated clay hydrogel particles from a large proportion of the suspending water which can then be readily removed by mechanical separation means, such as filtration or centrifuging.

In order to remove water from the system, a water-miscible organic solvent boiling below about 250° F. is utilized as a displacement fluid. If the displacing fluid were then evaporated at atmospheric pressure, the colloidal particles of clay would collapse and would be incapable of forming a grease structure with a subsequently added lubricating oil. Consequently, before removal of the displacing fluid, a limited amount of a lubricating oil is added thereto, after which the mixture is heated for two purposes, namely, the removal of the displacing fluid, and the oxidation of the aniline.

The two conditions necessary for successful completion of this process comprise: (1) the use of a gaseous oxidizing atmosphere, preferably an oxygen-containing gas, during the heating period, and (2) the use of an amount of lubricating oil sufficient to maintain the colloidal structure of the clay but insufficient to form a grease-like structure in the absence of the displacement fluid. Consequently, the mixture (subsequent to evaporation of the water-miscible organic solvent) is heat treated (1–48 hours, 250–600° F., preferably 4–48 hours, 300–500° F.) in the state of a friable composition not having the coherent grease-like structure necessary for a lubricating composition. The product which results from the heat treating step is not only free of the water displacement fluid, but also contains an oxidized aniline product adsorbed on the surfaces of the clay gel particles which imparts water resistance as well as thermal and oxidation resistance to greases made therefrom. This heat treated product may in itself comprise an article of commerce and be stored, transported, and sold as such. It may be diluted subsequently to any desired clay concentration for the preparation of greases having a particular lubricating oil base. Furthermore, it may be used as a filler or extender in other organic compositions, such as rubber, plastics, resins and the like. The additional step of mixing in, preferably by a shearing (milling or colloiding) action, of further quantities of a lubricating oil results in the formation of a grease structure.

According to the above description of the invention, it will be seen that two principal advantages are gained by the use of aniline and its eventual oxidation. First, the aniline acts as a coagulating agent promoting the clean separation of a concentrated clay hydrogel from the majority of water present in the original hydrogel. Secondly, after its oxidation, the oxidized aniline constitutes a high temperature stabilizer both with respect to oxidative degradation of the grease composition as a whole and promotes water resistance and thermal stability of the composition.

In the process according to the invention, clay is dispersed in water for two principal reasons: First, to separate the non-clay contaminants (generally referred to as gangue), and secondly, to swell the clay particles to their maximum extent so as to enable them to perform their function as gelling agents for the greases to be made therefrom.

In order to keep the clay hydrogel in workable (fluid) consistency, it is preferred that the clay be dispersed to yield a hydrogel containing between about 0.25% and about 3% by weight based on dry clay, exclusive of any gangue orginally present and inclusive of both suspending water and water directly absorbed on and within the clay particles. While the clay is largely dispersed throughout the entire body of the water in which it is incorporated, it is in the form of jelly-like colloidal globules which can be separated by mechanical means from a large part of water to yield a clay hydrogel of substantially increased clay content without shrinking the expanded colloidal structure of the clay.

By "mechanical separation" is meant any process for the separation of water from the colloid which does not involve appreciable shrinkage of the expanded clay structure, such as occurs, for example, in normal evaporation methods. Consequently, mechanical separation normally includes filtration techniques and accelerated substitutes therefor such as centrifuging. This mechanical separation is performed subsequent to the addition to the clay hydrogel of aniline in an amount between about 10% and about 200% based on dry clay weight. The mechanical separation (filtration or centrifuging) can take place at any desired temperature, room temperature being that preferably employed, although any temperature up to that of the boiling point of water may be utilized.

Prior to addition of aniline it is desirable to treat the clay hydrogel with a strong mineral acid such as sulfuric, hydrochloric or phosphoric, in an amount between about 1% and about 10% based on dry clay weight. This acid treatment apparently increases the colloidal gel volume or at least promotes its grease-forming ability. It does not constitute an essential step in the preparation of the subject grease compositions, but it is a preferred part thereof.

Addition of aniline to the clay hydrogel causes a separation of a concentrated hydrogel from a majority of the water originally present. This separation is most evident, not in the visible appearance of the hydrogel, but in the increased filterability thereof. Once the aniline has been added and the hydrogel is subjected to mechanical separation, substantial amounts of water may be mechanically separated therefrom with much greater ease than if aniline had not been employed. While amounts of aniline between about 10% and about 200% based on dry clay weight may be utilized, it is preferred that between 20% and 100% by weight threreof be employed. The aniline is apparently preferentially adsorbed by the clay surfaces and the amount which will be adsorbed is dependent in part upon the porosity and base exchange capacity of the clay. High base exchange clays like Wyoming bentonite and hectorite have been found to readily adsorb between about 30 and 100% by weight of anline. The remaining portion of aniline, i.e. that not absorbed upon the clay, remains suspended or dissolved in the separated water phase and is eventually removed by washing during subsequent water extraction procedures.

Following the mechanical separation of a large proportion of water from the hydrogel, the concentrated gel remaining is extracted with a water-soluble organic liquid preferably boiling below about 250° F. so as to enable its subsequent easy removal. This leaching operation is continued until substantially all of the water remaining in the gel has been displaced by the organic solvent. The latter may be any of those well known in the art, such as water-soluble alcohols or ketones, preferably aliphatic alcohols such as methanol, ethanol, isopropyl alcohol, acetone or methyl ethyl ketone. Corresponding low molecular weight esters such as ethyl acetate may be employed and mixtures of water-soluble organic solvents may be utilized. The organogel resulting from this water displacement procedure normally contains between about 2% and about 20% by weight of clay.

The next essential step in the production of the subject compositions comprises the addition to the concentrated organogel of a lubricating oil in an amount sufficient to prevent collapse of the clay colloidal structure but insufficient to cause the creation of a grease-like structure. In other words, the amount of lubricating oil to be added should be sufficient to maintain the expanded character of the clay particles, but should be present only in an amount sufficient to create discrete friable particles once the oarganic solvent has been removed therefrom. The amount of lubricating oil added at this stage of the process is normally between about 1 and about 10 parts by weight, based on the dry weight of the clay. This will depend in part upon the surface area of the clay but will preferably be between about 2 and about 7 parts by weight for each part by weight of clay. Under these conditions, when the displacement solvent is eventually removed, the resulting product comprising lubricating oil, clay and adsorbed aniline will be in the form of a crumbly, friable solid which can be readily exposed intimately with a contacting oxidizing atmosphere. It is preferred to mill the grease-forming composition at this stage or at least to insure that the organogel is thoroughly dispersed in the added lubricating oil.

Once these components have been assembled together, it remains only to subject the composition to a temperature sufficient to evaporate the displacement water-soluble liquid and to cause oxidation of the aniline remaining adsorbed upon the clay surface. This is normally effected by heating the mixture for a period of 1–48 hours at a temperature of 250°–600° F. in an oxidizing atmosphere, preferably one containing a substantial proportion of oxygen, such as air, or air enriched with oxygen. Dependent upon the severity of the oxidation treatment, both with respect to time and temperature, the aniline will be oxidized to a variety of products, the eventual one being that commonly known as aniline black. Intermediate oxidation products, however, also are satisfactory agents for the promotion of thermal and oxidation stability, as well as for improving the water resistance of the grease. These intermediate products are known as imarilidine, digraniline, and permagraniline, all as discussed and illustrated with respect to structure in Karrer, "Organic Chemistry," second edition (1946), pages 569–70. It is preferred that at least 50% of the aniline adsorbed on the surface of the clay particles be converted to the ultimate stage of aniline oxidation, namely, to aniline black. The aniline compound may constitute aniline per se, or aniline derivatives wherein the aniline nucleus

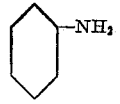

may bear amino hydroxyl or methyl radicals directly attached to the aromatic ring carbon atoms. Suitable species include the phenylene diamines, the amino phenols and the toluidines and xylidines.

The product so prepared constitutes a grease-forming article of commerce salable to customers desiring to add their own lubricating oils. Since the composition is in a friable form, it is readily incorporated in further amounts of any lubricating oil which a manufacturer wishes to utilize. Again dependent upon the surface area of the clay and upon the colloidal structure theerof, greases containing the supplementary amounts of oil to form a grease structure may contain from about 1% to about 8% by weight of clay, although the precise amount of gelling agent is not critical insofar as a description of the present invention is concerned. The only limitation is that a sufficient amount of a lubricating oil should be present to form the usual jelly-like or butter-like grease consistency.

The supplementary amounts of lubricating oil are preferably introduced into the grease-forming structure by a shearing action such as subjecting the composition to milling or to high pressure (over 500 p.s.i.) pumping.

The clays utilized in the subject class of greases are especially preferred for use in high temperature grease compositions due to their relatively inert character at these high operating temperatures. While clays of low base exchange capacity such as Georgia clay, attapulgite and the like may be utilized, it is preferred that a high base exchange clay, such as Wyoming bentonite or hectorite, be employed.

While the present invention is especially directed to extreme high temperature lubricating greases, they may be employed for normal operating conditions as well. Hence, and especially useful at these operating conditions below about 400° F., any of the well-known lubricating oils may be utilized. These include mineral oil lubricants and synthetic lubricating oils of known types, such as the polymerized olefins, phosphorus esters, silicon esters and aliphatic esters formed by esterification of aliphatic dicarboxylic acids with monohydric alcohols. Typical species of these materials include tricresyl phosphate, dioctyl phthalate, bis(2-ethylhexyl)silicate, and the like.

Lubricants to be employed at temperatures in excess of about 400° F. are those having an inherent high thermal stability, including the halocarbons and organo-silicon fluids. The halocarbons may be those described in Peterson et al. patent—U.S. 2,679,479, and include especially the fluorocarbon oils, preferably distilling above about 200° C. at atmospheric pressure, and chlorofluorocarbons.

The most useful class of lubricants for grease compositions to be utilized at temperatures in excess of about 400° F. include the organo-substituted silicon fluids of lubricating oil viscosity. Liquid organo-silicon polymers which are adapted for the preparation of the subject high temperature grease compositions may be obtained by the hydrolysis and chemical condensation of one or more hydrolyzable silicon compounds having the general formula $R_2SiX_2$, wherein R is a lower alkyl radical and X is a hydrolyzable group selected from the class consisting of halogen and alkoxy groups. They may also be obtained by the hydrolysis and chemical condensation of a mixture of alkylated silicon compounds containing at least 75 mol percent of such dialkyl silicon compound having the general formula $R_2SiX_2$ and not more than 25 mol percent of a monoalkyl silicon compound having the formula $RSiX_3$, or a total of not more than 25 mol percent of both such monoalkyl silicon compound and a trialkyl silicon compound having the formula $R_3SiX$. In all of these formulae, R and X have the meanings stated above. In general, the hydrolyzable silicon compound or mixture of such compounds from which the liquid organo-silicon polymers may be prepared is one having an average composition corresponding to the formula $R_{4-z}SiX_z$, wherein z is a whole or a fractional number from 2.25 to 1.5 and R and X have the meanings given above.

Examples of hydrolyzable dialkyl silicon compounds which may be used in preparing the liquid organo-silicon polymers are dimethyl silicon dichloride, methyl ethyl silicon dichloride, diethyl silicon dichloride, methyl propyl silicon dichloride, dimethyl silicon dibromide, diethyl silicon dibromide, dimethyl-dimethoxy-silicon, diethyl-diethoxy-silicon, dimethyldiethoxy-silicon, etc. Examples of hydrolyzable monoalkyl silicon compounds and hydrolyzable trialkyl silicon compounds which may be present together with the dialkyl silicon compound in amount not exceeding 25 mol percent of the mixture are methyl silicon trichloride, ethyl silicon tribromide, ethyl silicon trichloride, propyl silicon trichloride, methyl-trimethoxy-silicon, methyl-triethoxy-silicon, ethyl-triethoxy-silicon, trimethyl silicon chloride, trimethyl silicon bromide, triethyl silicon chloride, trimethyl-methoxy-silicon, trimethyl-ethoxy-silicon, triethyl-ethoxy-silicon, etc.

The liquid organo-silicon polymer may be obtained by heating the hydrolyzable silicon compound or compounds with water in the presence of a hydrolysis catalyst, e.g. a mineral acid. Hydrolysis of the silicon compounds to form corresponding organo-silicols (which silicols are unstable under the reaction conditions and in some instances have not been isolated as such) is accompanied by chemical condensation of the silicols to form the liquid organo-silicon polymer (or copolymer) product. The starting materials are selected so that the product contains an average of between 1.75 and 4, and preferably between 1.9 and 2.5, atoms of carbon per atom of silicon.

The viscosity of such polymer or copolymer is, of course, dependent upon the reaction conditions employed in preparing the same, e.g. the polymers of dimethyl silicon vary from thin liquids to viscous liquids to solid resins depending upon the conditions under which they are prepared. It is the liquid polymers and copolymers having a preferred viscosity exceeding 500 Saybolt seconds at 100° F., which are usually employed in preparing the new compositions and such liquid polymers of dimethyl silicon are preferred.

*Example I*

One kilogram of a 2% hectorite clay aqueous slurry is acidified with 1.4 g. of 85% $H_3PO_4$. To this mixture is added 40 g. of aniline. The water is removed by filtration. The filter cake is washed with two 1000 ml. portions of alcohol. The aniline coated clay is then dispersed in one 1000 ml. portion of alcohol and 100 g. of Dow Corning silicone fluid is added DC–550). The alcohol is removed by evaporation. The grease is heated in a forced draft oven at 300° F. for 2 days. One hundred g. of silicone oil is milled into the hard paste with the aid of a three-roll paint mill. The resulting black grease has smooth texture.

Properties:
    ABEC bearing test—10,000 r.p.m. at 450° F.—198 hours to failure
    Thin film test—11% evaporation after 24 hours at 450° F. Rating—excellent
    Bleeding—2 hours at 300° F.=2%
    Percent water absorption (Army-Navy Specification AN–G–3a method)=35%

Dow Corning methylphenyl (ratio 0.6) silicone fluid DC–550 has a viscosity of 100–150 centistokes at 25° C.; a viscosity temperature coefficient of 0.75; a freezing point of −48° C.; a boiling point of 250° C. and a refractive index at 25° C. of 1.487.

*Example II*

The process of Example I was repeated, except that 8 g. of aniline was used to coat the clay instead of 40 g. The grease so obtained had excellent stability at bearing temperatures of 450° F. DC–550 is a silicone fluid having a viscosity of 300–400 SSU at 100° F., a refractory index of 25° C. of 1.487, and a freezing point of about minus 48° C.

We claim as our invention:

1. The process for the preparation of a high temperature grease composition which comprises: (*a*) forming a clay hydrogel; (*b*) adding thereto 20–200% by weight, based on the clay, of aniline, whereupon aniline is adsorbed on the clay gel, water separates therefrom and is removed by mechanical separation; (*c*) displacing the water remaining in the gel with a water-soluble alcohol; (*d*) adding 1–10 parts of a silicone oil of lubricating viscosity thereto, said amount being insufficient to form a cohered mass with the clay, in the absence of alcohol; (e) heating the mixture in the presence of air at a temperature of 300–500° F. for 4–48 hours, whereby the alcohol is removed and aniline is oxidized on the gel surface; (f) adding to the heat treated product an amount of silicone oil sufficient to form a grease structure therewith.

2. A process according to claim 1 wherein the oil is a dimethyl silicone.

3. A process according to claim 1 wherein the oil is a methyl phenyl silicone.

4. The process for the preparation of a grease-forming composition which comprises forming a clay hydrogel having relatively poor filterability; adding thereto between about 10% and about 200%, based on the dry weight of the clay, of aniline, whereby a more concentrated hydrogel of improved filterability forms a separate phase from a portion of the water present, and is isolated therefrom by mechanical separation, displacing the remaining water from the hydrogel with a water-miscible organic liquid boiling below about 250° F. of the group consisting of alcohols, ketones and esters, whereby an organogel is formed, adding 1–10 parts of a lubricating oil per part of clay to the organogel, said lubricating oil being selected from the group consisting of mineral oil lubricants, polymerized olefins, phosphorus esters, silicon esters, aliphatic esters, halocarbons, and organo-silicon fluids, heating the resulting mixture for 1–48 hours in an oxygen-containing atmosphere at a temperature of 250–600° F., whereby the water-miscible liquid evaporates and oxidized aniline adsorbed on the surface of clay is formed, the amount of oil present being sufficient to substantially maintain the colloidal structure of the clay but insufficient to form a cohered grease structure.

5. A process according to claim 4 wherein the product so obtained is subjected to a shearing action in the presence of a sufficient amount of additional lubricating oil to form a grease structure.

6. A grease composition comprising a major amount of a dimethyl silicone oil of lubricating viscosity gelled to a grease consistency with a colloidally dispersed clay, said clay bearing on the surfaces thereof between about 10% and about 100%, by weight of clay, of aniline black.

7. A grease composition comprising a major amount of a silicone oil of lubricating viscosity and 1–8% by weight of a clay colloidally dispersed therethrough, said clay bearing on the surfaces thereof 10–100% by weight, based on the clay, of an oxidized aniline compound of the group consisting of aniline, phenylene diamine, amino phenols and toluidines.

8. A grease composition comprising a major amount of a silicone oil of lubricating viscosity and a gelling proportion of a clay colloidally dispersed therethrough, said clay bearing on the surfaces thereof 10–100% by weight, based on the clay, of aniline black.

9. A clay composition comprising a major amount of a silicone oil of lubricating viscosity and a gelling proportion of a clay colloidally dispersed therethrough, said clay bearing on the surfaces thereof 10–100% by weight, based on the clay, of oxidized aniline.

10. A grease composition comprising a major amount of a lubricating oil of the group consisting of mineral oil lubricants, polymerized olefins, phosphorus esters, silicon esters, aliphatic esters, halocarbons and organo silicon fluids and a gelling proportion of a clay colloidally dispersed therethrough, said clay bearing on the surfaces thereof 10–100% by weight, based on the clay, of an oxidized aniline compound of the group consisting of aniline, phenylene diamines, amino phenols and toluidines.

11. A non-cohesive friable grease-forming composition comprising 1–10 parts by weight of a lubricating oil having colloidally dispersed therethrough 1 part by weight of a clay having oxidized aniline adsorbed on the surfaces in an amount between about 10% and about 100% based on the clay.

References Cited in the file of this patent
UNITED STATES PATENTS

| 2,033,856 | Smith | Mar. 10, 1936 |
| 2,623,853 | Stross | Dec. 30, 1952 |

FOREIGN PATENTS

| 154,698 | Australia | July 29, 1954 |